United States Patent [19]

Lemcoe et al.

[11] 4,195,279

[45] Mar. 25, 1980

[54] ATTACHING OF STRAIN GAGES TO SUBSTRATES

[76] Inventors: Robert A. Frosch, Administrator of the National Aeronautics and Space Administration, with respect to an invention of Meyer M. Lemcoe, Upper Arlington; Harry E. Pattee, Columbus, both of Ohio

[21] Appl. No.: 878,539

[22] Filed: Feb. 16, 1978

[51] Int. Cl.² ............................................. G01L 1/22
[52] U.S. Cl. ................................ 338/2; 219/85 R; 219/85 CA; 219/85 CM
[58] Field of Search ............ 338/2; 219/85 R, 85 CA, 219/85 CM

[56] References Cited

U.S. PATENT DOCUMENTS

| | | | |
|---|---|---|---|
| 3,060,395 | 10/1962 | Sandven | 338/2 |
| 3,089,020 | 5/1963 | Hurlebaus | 338/2 |
| 3,141,232 | 7/1964 | Russell | 338/2 X |
| 3,141,949 | 7/1964 | Lovell | 219/85 R |
| 3,451,030 | 6/1969 | Garfinkel | 338/2 |
| 4,086,554 | 4/1978 | Sieder | 338/2 |

*Primary Examiner*—C. L. Albritton
*Attorney, Agent, or Firm*—Monte F. Mott; John R. Manning; Paul F. McCaul

[57] ABSTRACT

A method and apparatus for attaching strain gages to substrates is described, which is especially useful for field installation, and especially for materials which experience a drastic reduction in fatigue strength when heated as in spot welding. A strain gage having a backing plate is attached to a substrate by using a foil of brazing material between the backing plate and substrate. A pair of electrodes that are connected to a current source, are applied to opposite sides of the backing plate, so that heating of the structure occurs primarily along the relatively highly conductive foil of brazing material. Field installations are facilitated by utilizing a backing plate with "wings" extending at an upward incline from either side of the backing plate, by attaching the electrodes to the wings to perform the brazing operation, and by breaking off the wings after the brazing is completed.

5 Claims, 5 Drawing Figures

U.S. Patent    Mar. 25, 1980    4,195,279
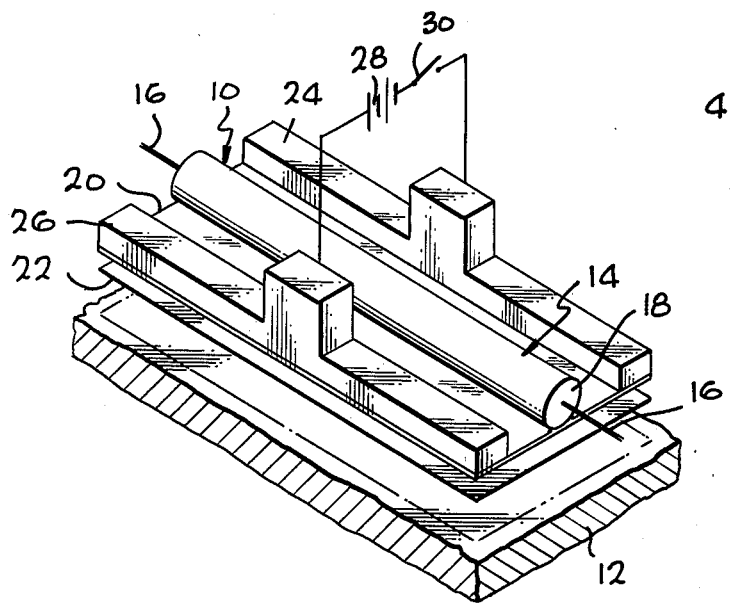
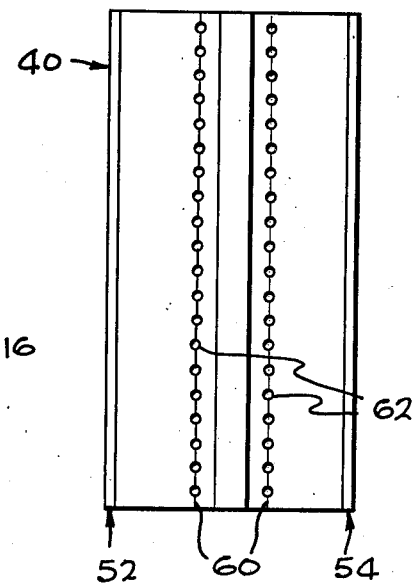
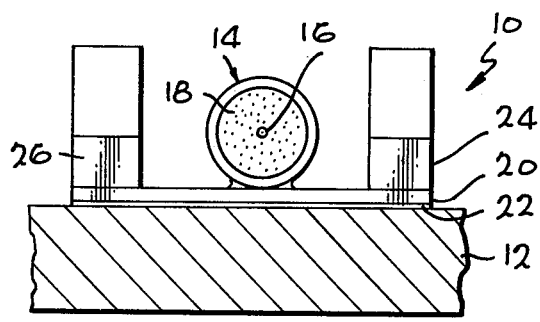
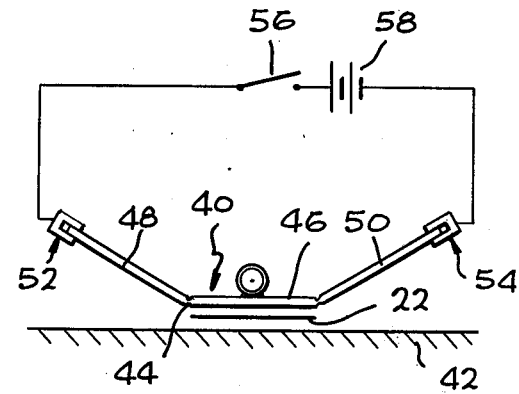
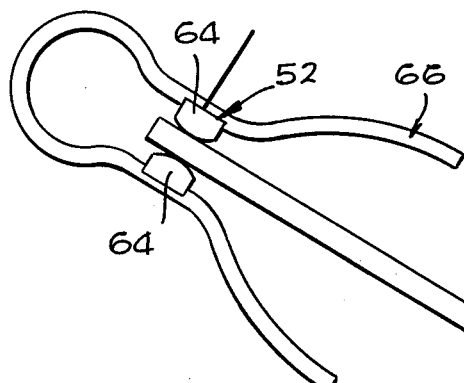
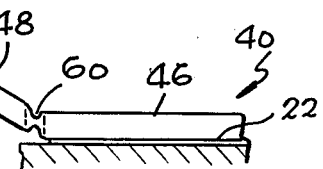

ATTACHING OF STRAIN GAGES TO SUBSTRATES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to methods and apparatuses for attaching strain gage devices.

Strain gages are often provided with thin backing plates or flanges, that can be welded to a base by resistance spot welding. In such welding, one electrode presses down on the strain gage backing plate while another electrode presses on the base to carry current through the plate and base to weld them together. However, this method, while satisfactory for many materials, cannot be used on flight status aircraft or any other structure formed of a material such as titanium or Rene 41, which experiences a drastic reduction in fatigue strength as a result of the welding operation.

One method for attaching the gage while minimizing reduction in fatigue strength of the base material, includes brazing wherein a quantity of brazing material such as a silver or gold-base alloy is utilized which melts at a moderate temperature. A foil of such material can be placed between the gage backing plate and the base. Then, a pair of resistance welding electrodes can be utilized which press respectively against the backing plate and base to hold them together while a current is applied, the current being somewhat less than that utilized in resistance welding. However, the equipment and technique are relatively cumbersome for field installations, and the base is subjected to more heating than is desirable. A field installation technique for installing strain gages, which utilized relatively compact and easily manipulated equipment, and which minimized heating of the base material to which the strain gage backing plate is applied, would be of considerable value.

SUMMARY OF THE INVENTION

In accordance with one embodiment of the present invention, a method and apparatus are provided for attaching a strain gage backing plate to a base in a manner that is easy to perform with minimal equipment in field installations, and which produces minimal heating of the base material. A thin foil of brazing material such as a silver or gold-base alloy, is sandwiched between the strain gage backing plate and a base to which the strain gage is to be attached. A pair of electrodes are placed in contact with opposite sides of the backing plate, and a current is applied through the electrodes. The current flows parallel to the foil of brazing material so that it melts and joins the strain gage backing plate to the base upon cooling. Where a brazing material of high electrical conductivity is utilized, a considerable amount of the current passes through the foil of brazing material so that it is quickly heated to its melting temperature with minimal heating of the base material.

In order to facilitate attachment of the electrodes, the backing plate can be provided with a pair of upwardly inclined flanges or "wings" at its opposite sides. Also, perforations or other weakening means are utilized at the intersection of the wings with the central backing plate on which the strain gage rests. The electrodes can be easily clamped to the wings to perform the brazing operation, and thereafter the wings can be broken off from the middle backing plate portion to leave a neat strain gage installation.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective exploded view of a strain gage installation, showing the manner in which the installation is performed.

FIG. 2 is an end view of the strain gage installation of FIG. 1.

FIG. 3 is an exploded end view of a strain gage installation, constructed in accordance with another embodiment of the invention, showing the manner in which the installation is performed.

FIG. 4 is a plan view of the installation of FIG. 3.

FIG. 5 is a partial enlarged and detailed view of the installation of FIG. 3.

DESCRIPTION OF THE PREFERRED EMBODIMENT

FIGS. 1 and 2 illustrate a strain gage device 10 which can be mounted on a base 12 in a manner that minimizes heating of the base. The strain gage device includes a tube 14 of stainless steel which surrounds a filament 16 which undergoes a change in resistance as it is deformed, and which is securely held by a ceramic encapsulant 18 within the tube. A thin backing plate or flange 20, which may be formed of stainless steel, is attached securely to the tube and facilitates its mounting on a flat base 12.

The installation of the strain gage device 10 is accomplished by the use of a foil 22 of brazing material, which is preferably constructed of highly conductive material such as of silver and copper or gold and copper. The foil 22 is sandwiched between the backing plate 20 and the base 12. Then, a pair of electrodes 24, 26 are pressed against opposite sides of the backing plate 20, and current is supplied from a current source 28 through a switch 30 and through the electrodes. The current flows primarily in a direction parallel to the plane of the foil 22 of brazing material, with some of the current flowing through the foil 22, some flowing through the backing plate 20, and some flowing through the base 12. The current heats the foil to a temperature at which it melts, and when the current stops and the foil cools, it will attach the backing plate 20 securely to the base 12.

In prior art situations, one electrode was positioned under the base 12 or otherwise attached to the underside of the base. In the present method the electrodes 24, 26 can be applied to opposite sides of the backing plate 20, to press the strain gage device securely against the base while current flows therethrough. This not only makes field installation easier, but also results in more efficient heating of the brazing foil 22. In the case of resistance welding, a current passing from an electrode lying against the top of the backing plate to another electrode under the base, causes heating of the adjacent plate and base portions to weld them together. However, where a foil of brazing material 22 is utilized, and where heating of this foil is desired rather than of the backing plate or base, a flow of current along the length of the foil can be more efficient in heating it. Also, where the foil is of higher conductivity than the backing plate 20 or base 12, it will carry a higher density of current than the backing plate or base and therefore will undergo more heating than the base 12, to thereby melt the foil while minimizing heating of the base. The application of minimin heat to the base 12 is important where the base is formed of materials such as titanium or Rene 41 which experience a considerable reduction in fatigue strength after being heated to high temperatures.

FIGS. 3–5 illustrate a strain gage device 40 which is designed to facilitate field installation to a base 42. The device 40 is similar to that of FIGS. 1 and 2, except that the backing plate 44 includes a middle portion 46 and two upwardly-inclined side portions or wings 48, 50. The upwardly inclined wings facilitate the application of the electrodes 52, 54 for the transmittal of current along the width of the center plate portion 46 and of the foil 22 and base portion 42 immediately thereunder.

The strain gage device 40 is installed by attaching the electrodes 52, 54, closing a switch 56 to connect the current source 58 to the electrodes to pass current therethrough sufficient to melt the brazing foil 22. To this end, the switch 56 may comprise a timing circuit which closes for a predetermined period. Then, the wings 48, 50 must be removed so as to provide a neat installation without unnecessary protruding parts. This can be accomplished by providing weakened regions at 60, where each wing is connected to a side of the center portion 46. This can be accomplished by providing perforations 62, and further weakening can be provided by making this region 60 thinner than the rest of the backing plate. As shown in FIG. 5, each electrode such as 52, can include highly conductive portions 64 that are biased against opposite sides of a wing 48 by a spring 66, to facilitate secure holding of each electrode on a wing. In order to further facilitate installation, the foil 22 is bonded to the lower surface of the center backing plate portion 46. In a typical installation, a backing plate 46 of 5 mil may be provided together with a foil 22 of one mil thickness. A typical foil material composed of 45% silver, 15% copper, 24% cadmium, and 15% zinc, may be utilized.

Thus, the invention provides a method and apparatus for facilitating the installation of a strain gage device while also minimizing heating of the base to which the device is attached. This can be accomplished by positioning a foil of brazing material between a backing plate of the strain gage device and the base, and connecting electrodes to pass current in a lateral direction between the opposite side of the backing plate, so that some of the current flows laterally along the width of the foil of brazing material. This is especially effective where the foil has a greater conductivity than that of the backing plate or base material. The electrodes may be applied to opposite sides of a flat backing plate. Easier installation can be accomplished by providing a backing plate with a pair of upwardly inclined wings at opposite sides of a center backing plate portion which will lie against the brazing material foil that lies against the base. The wings can be joined at weakened portions to the center backing plate portion, to facilitate breaking off of the wings after brazing has been completed.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for installing a strain gage device having a substantially flat lower surface portion, on a substantially flat base, comprising:
    placing a solid foil of brazing material between said gage and said base prior to heating of them; and
    heating the foil to a temperature between the melting points of said foil and said base;
    said step of heating including passing a current through at least said foil primarily in a direction along the plane of said foil between opposite sides thereof.

2. The method described in claim 1 wherein:
    said foil of brazing material is formed of material having a conductivity which is higher than that of the material of said strain gage lower surface portion and higher than that of said base material.

3. A method for installing a strain gage device having a substantially flat lower surface portion, on a substantially flat base, comprising:
    placing a solid foil of brazing material between the base and a gage prior to heating them, wherein the gage has a backing with a middle portion which can be laid facewise adjacent to said base, and the gage also has a pair of wings that extend from either side of said middle portion and away from said base when said center portion lies facewise adjacent to said base;
    heating the foil to a temperature between the melting points of said foil and said base, including connecting a current source to said wings to flow current between them to heat said middle portion and said foil; and
    removing said wings from said middle portion.

4. A method for attaching a strain gage backing plate to a base, comprising:
    sandwiching a foil of brazing material between said gage backing plate and said base, wherein said gage backing plate includes a middle portion and a pair of wing portions extending at an incline from said middle portion;
    applying electrodes to said wing portions;
    passing current through said electrodes to heat said foil to melt it; and
    separating said wing portions from said middle portion after said step of passing current to melt said foil.

5. A strain gage assembly for installation on a base, comprising:
    a gage which includes a backing plate, said backing plate including a middle portion which can lie facewise adjacent to said base, and a pair of opposite side wing portions lying on opposite sides of said middle portion; and
    a foil of brazing material sandwiched between said backing plate and said base, said foil constructed of material of greater electrical conductivity than the material of either said base or backing plate.

* * * * *